(12) United States Patent
Lewis et al.

(10) Patent No.: US 9,760,839 B1
(45) Date of Patent: Sep. 12, 2017

(54) ELECTRONIC RECORDING STATEMENT MANAGEMENT

(75) Inventors: Olvin Brett Lewis, New Braunfels, TX (US); Michael Patrick Burns, San Antonio, TX (US); Cleburne Robinson Burgess, Helotes, TX (US); Leena Maria Klint-Looney, San Antonio, TX (US); Nadine Khaled Tabet, San Antonio, TX (US); Janine Marie Modgling, Castroville, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 623 days.

(21) Appl. No.: 11/828,269

(22) Filed: Jul. 25, 2007

(51) Int. Cl.
*G06Q 10/00* (2012.01)

(52) U.S. Cl.
CPC .................................. *G06Q 10/00* (2013.01)

(58) Field of Classification Search
None
See application file for complete search history.

(56) References Cited

U.S. PATENT DOCUMENTS

| | | | |
|---|---|---|---|
| 5,644,736 A | 7/1997 | Healy et al. | |
| 5,812,870 A | 9/1998 | Kikinis et al. | |
| 6,023,709 A * | 2/2000 | Anglin | G06F 11/0727 |
| 6,175,830 B1 | 1/2001 | Maynard | |
| 6,237,011 B1 | 5/2001 | Ferguson et al. | |
| 6,243,703 B1 | 6/2001 | Couch et al. | |
| 6,370,538 B1 | 4/2002 | Lamping et al. | |
| 6,604,108 B1 | 8/2003 | Nitahara | |
| 6,952,281 B1 | 10/2005 | Irons et al. | |
| 7,124,112 B1 * | 10/2006 | Guyan et al. | 705/44 |
| 7,131,069 B1 | 10/2006 | Rush et al. | |
| 7,203,654 B2 | 4/2007 | Menendez | |
| 7,370,273 B2 | 5/2008 | Beyer et al. | |
| 7,406,427 B1 | 7/2008 | Guyan et al. | |
| 7,433,885 B2 | 10/2008 | Jones | |
| 7,446,892 B1 | 11/2008 | Churchill et al. | |
| 7,448,001 B2 | 11/2008 | Miyazaki et al. | |
| 7,506,327 B2 * | 3/2009 | Kovacs | H04L 67/02 717/144 |

(Continued)

OTHER PUBLICATIONS

Dalzell, M., "Where Will Health Plans Find the Next Generation of Savings?" *Managed Care Magazine*, http://www.managedcaremag.com/archives/0109/0109.nextgen.html, 2001, downloaded Apr. 11, 2007, 10(9), 8 pages.

(Continued)

*Primary Examiner* — Leland Marcus
(74) *Attorney, Agent, or Firm* — Baker Hostetler LLP

(57) ABSTRACT

An audio recording is created and is automatically associated with metadata related to a component of an event. A hierarchical data structure comprising structural elements associated with components of the event is accessed via a user interface of an electronic file management system. The user interface facilitates the initiation of an audio recording and the selection of metadata associated with a selected element of the hierarchy for automatic association with an audio recording. Access to the audio recording file may be limited to processes that will not modify the original audio file. User interfaces facilitate playing, emailing, copying, and requesting a transcript of the audio file.

21 Claims, 12 Drawing Sheets

(56) References Cited

U.S. PATENT DOCUMENTS

| | | | |
|---|---|---|---|
| 7,711,440 B1* | 5/2010 | Campbell | G05B 19/4183 700/19 |
| 7,770,123 B1 | 8/2010 | Meyer et al. | |
| 8,060,394 B2 | 11/2011 | Woodings et al. | |
| 8,375,072 B1 | 2/2013 | Burgess et al. | |
| 8,396,909 B1 | 3/2013 | Burgess et al. | |
| 2001/0011286 A1 | 8/2001 | Inoue et al. | |
| 2002/0007287 A1 | 1/2002 | Straube et al. | |
| 2002/0111936 A1 | 8/2002 | Adams et al. | |
| 2002/0184231 A1* | 12/2002 | Baskins | G06F 17/30961 |
| 2003/0023811 A1* | 1/2003 | Kim et al. | 711/114 |
| 2003/0088441 A1 | 5/2003 | McNerney | |
| 2003/0120372 A1 | 6/2003 | Ruth et al. | |
| 2003/0149657 A1 | 8/2003 | Reynolds et al. | |
| 2003/0200118 A1 | 10/2003 | Lee et al. | |
| 2003/0214538 A1 | 11/2003 | Farrington et al. | |
| 2003/0218641 A1 | 11/2003 | Longobardi | |
| 2004/0078337 A1 | 4/2004 | King et al. | |
| 2004/0103102 A1 | 5/2004 | Nelson | |
| 2004/0153479 A1* | 8/2004 | Mikesell et al. | 707/200 |
| 2004/0177058 A1 | 9/2004 | Carpentier et al. | |
| 2004/0186750 A1 | 9/2004 | Surbey et al. | |
| 2004/0190691 A1* | 9/2004 | Schoeman | 379/88.16 |
| 2004/0205622 A1 | 10/2004 | Jones et al. | |
| 2004/0236676 A1 | 11/2004 | Takezawa et al. | |
| 2004/0267694 A1 | 12/2004 | Sakai et al. | |
| 2005/0033773 A1 | 2/2005 | Roberge et al. | |
| 2005/0050472 A1 | 3/2005 | Faseler et al. | |
| 2005/0114356 A1 | 5/2005 | Bhatti | |
| 2005/0203718 A1 | 9/2005 | Carek et al. | |
| 2005/0203885 A1 | 9/2005 | Chenevich et al. | |
| 2005/0210040 A1 | 9/2005 | Beres et al. | |
| 2005/0223024 A1 | 10/2005 | Hyun et al. | |
| 2005/0223331 A1 | 10/2005 | Wolff et al. | |
| 2005/0228683 A1 | 10/2005 | Saylor et al. | |
| 2006/0005156 A1 | 1/2006 | Korpipaa et al. | |
| 2006/0026499 A1 | 2/2006 | Weddle | |
| 2006/0045386 A1 | 3/2006 | Fukuoka et al. | |
| 2006/0080140 A1 | 4/2006 | Buttner et al. | |
| 2006/0080278 A1 | 4/2006 | Neiditsch et al. | |
| 2006/0085374 A1 | 4/2006 | Mayes et al. | |
| 2006/0093094 A1* | 5/2006 | Xing et al. | 379/1.02 |
| 2006/0101041 A1 | 5/2006 | Agarwal et al. | |
| 2006/0173904 A1 | 8/2006 | Nakajima | |
| 2006/0173934 A1 | 8/2006 | Echtenkamp | |
| 2006/0195491 A1 | 8/2006 | Nieland et al. | |
| 2006/0206511 A1 | 9/2006 | Picon et al. | |
| 2006/0242164 A1* | 10/2006 | Evans | G06F 17/301 |
| 2007/0016622 A1* | 1/2007 | Havewala et al. | 707/200 |
| 2007/0055550 A1 | 3/2007 | Courtney et al. | |
| 2007/0061393 A1 | 3/2007 | Moore | |
| 2007/0094296 A1 | 4/2007 | Peters, III | |
| 2007/0100669 A1 | 5/2007 | Wargin et al. | |
| 2007/0106678 A1 | 5/2007 | Ahrens et al. | |
| 2007/0106932 A1 | 5/2007 | Coar | |
| 2007/0125844 A1 | 6/2007 | Libin et al. | |
| 2007/0174094 A1* | 7/2007 | Ramsey | 705/4 |
| 2007/0177824 A1 | 8/2007 | Cattrone et al. | |
| 2007/0198560 A1 | 8/2007 | Foygel et al. | |
| 2007/0276704 A1 | 11/2007 | Naumann et al. | |
| 2008/0059500 A1 | 3/2008 | Symens | |
| 2008/0078836 A1 | 4/2008 | Tomita | |
| 2008/0080777 A1 | 4/2008 | Tomita | |
| 2008/0091690 A1 | 4/2008 | Ellersick et al. | |
| 2008/0148190 A1 | 6/2008 | Schaff | |
| 2008/0155652 A1 | 6/2008 | DeBie | |
| 2008/0162535 A1 | 7/2008 | Bak | |
| 2008/0168024 A1 | 7/2008 | Petty | |
| 2008/0243890 A1 | 10/2008 | Glatfelter et al. | |
| 2008/0276171 A1* | 11/2008 | Sabo | G06F 17/30126 715/711 |

OTHER PUBLICATIONS

Datascrib, Inc., "Services: Recorded Claim Statements," http://datascribe-inc.net/services_claim_statement.html, downloaded Jul. 12, 2007, 2 pages.

FileNet Corporation, "Balboa Life & Casualty: Improved customer service and saved over $500,000 per year by automating claims processing the right way to go with the flow," http://www.filenet.com/English/Success/Stories/Global-English/020110005, 2005, downloaded Apr. 11, 2007, 1-3.

Guidewire Software ©, "Guidewire Claim Center: P&C Insurance Claims," http://www.guidewire.com/elqNow/elqRedir.htm?ref=/files/pdf/Guidewire_ClaimCenterBrochure.pdf, 2007, downloaded Apr. 11, 2007, 5 pages.

SAP, "Enhanced Claims Management with SAP® Claims Management," http://download.sap.com/download.epd?context=E594FC1E39252ADD6178134C931F7326987D6350CAF817F64168B6CFB81D6507E2FAC47A83A69DA0F5DAE4EE79C10A36DD95CAB1B52FE195, 2006, downloaded Apr. 11, 2007, 4 pages.

U.S. Appl. No. 11/734,721, Cleburne Robinson Burgess et al., filed Apr. 12, 2007.

U.S. Appl. No. 11/734,728 Cleburne Robinson Burgess et al., filed Apr. 12, 2007.

U.S. Appl. No. 11/734,737 Cleburne Robinson Burgess et al., filed Apr. 12, 2007.

U.S. Appl. No. 11/734,746 Cleburne Robinson Burgess et al., filed Apr. 12, 2007.

U.S. Appl. No. 11/734,756 Cleburne Robinson Burgess et al., filed Apr. 12, 2007.

U.S. Appl. No. 11/734,764 Cleburne Robinson Burgess et al., filed Apr. 12, 2007.

U.S. Appl. No. 11/828,247 Olvin Brett Lewis et al., filed Jul. 25, 2007.

U.S. Appl. No. 11/828,255 Olvin Brett Lewis et al., filed Jul. 25, 2007.

Eder, et al. "Self-maintained Folder Hierarchies as Document Repositories", International Conference on Digital Libraries: Research and Practice, 2000, pp. 1-8, accessed online at <http://www.epanagos.com/pubs/00_kyoto.pdf> on Oct. 28, 2009.

* cited by examiner

400

- 401 — Loss Details
- 402 — Documentation
- 403 — File Management
- 404 — Reserves & Payments
- 405 — Policy
- 406 — Westerville Police Dept - Police/Fire
- 407 — Leroy Anderson - Witness
- ⊟ Jane Smith - Pedestrian
  - Dr. Willard Jenkins - Doctor
- 408 — ⊟ IV 2004 Ford F150
  - 412 — ⊟ Jamie Lauck - Driver
    - 417 — ⊟ St. Luke's Lutheran - Hospital
      - 418 — Jones Smith - Attorney
  - 414 — Ricky Lauck - Owner
- 409 — ⊟ CV 1999 Chevy Suburban
  - 413 — Tom Jones - Driver
  - 415 — Jane Jones - Passenger
  - 416 — State Farm - Insurance
- 410 — ⊟ Stationary Object – White Picket fence in front Yard
  - Mary Smith - Owner
- 411 — Clint Boat - 1999 Sapphire 35-Foot

ND STATEMENT
ELECTRONIC RECORDING STATEMENT MANAGEMENT

CROSS REFERENCE TO RELATED APPLICATIONS

This application is related by subject matter to the inventions disclosed in the following commonly assigned applications: U.S. patent application Ser. No. 11/828,247, filed Jul. 25, 2007, entitled "Electronic Recorded Statement Management"; U.S. patent application Ser. No. 11/828,255, filed Jul. 25, 2007, entitled "Electronic Recorded Statement Management".

BACKGROUND OF THE INVENTION

Some events, such as insurance claims and litigation, have traditionally been tracked and managed using paper files. These files typically include various documents, notes and other paperwork that are associated with the event. In addition, the file may be organized in some manner to enable a user to track various components of the event. Although paper files are generally secure and capable of being stored over long periods of time, they have significant drawbacks.

For example, if an event is particularly complex, the paper file may become very large, or may need to be separated into several files. Such an arrangement increases the likelihood that a part of the file may become lost. In addition, a paper file cannot be easily shared by several users, especially if the users are not in the same location.

Another area in which paper files are lacking is the maintenance of event-related documents. Using an automobile insurance claim as an example of an event, a document related to that event may be a photograph of an accident scene. If a user (e.g., an insurance representative) needs to take notes with respect to the photograph, the user may simply write on the photograph itself. If an unaltered version of the photograph is subsequently needed, the photographer may need to be contacted, or the photograph retaken. Alternatively, the user would have to store an unaltered copy of the document in the file, along with the altered version, which would increase the size of the file and again increase the likelihood that a part of the file would become lost or disorganized. A further shortcoming of paper-based files is the inability to easily maintain cross-references between documents and the parts of the file to which the documents pertain. This shortcoming is particularly pronounced as the size of the file increases and portions of the file change, as it requires a great deal of effort to manually maintain the accuracy of the file.

It is sometimes useful to associate a recorded statement or other audio recording with an event and/or with other files associated with an event. For example, an audio record may be desired of a statement received telephonically or received orally by a field representative. Typically, such statements might be recorded on a portable recording device such as a cassette recorder that may be adapted to record over a telephone. More recently, portable digital recording devices have been employed. Recordings then exist as a physical tape or an electronic file on a portable device. Associating the recording with an event or with files associated with an event may have involved placing a physical copy of the recording, a cassette or disk for example, in a physical file associated with the event.

SUMMARY OF THE INVENTION

Some efforts have been made to create electronic file management systems, but conventional electronic file systems lack the ability to associate electronic documents with an event in a logical fashion. Rather, the documents typically are listed in an electronic folder that is assigned to the event. A user who needs to access a document would have to access the folder and then inspect the documents, normally by using the names given to each document, to ascertain their relevance to the event. Improved systems and methods for managing an electronic file system are described below. There now exists a need to be able to integrate an audio recording with a modern electronic file system.

Systems, computer readable media, and methods are provided for obtaining an audio recording and appropriately integrating the audio recording with an electronic file management system. A recording application can be accessed from within the workflow of the electronic file management system, and the resulting recording can automatically be associated with one or more components of an electronic file. An electronic file of the recording may then be centrally stored and accessed from within the electronic file management system, enabling the recording to be played back, electronically distributed, and otherwise managed. A mechanism for restricting access to the recording file can be provided so as to preserve the original recording.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following detailed description, is better understood when read in conjunction with the appended drawings. For the purpose of illustrating the claimed subject matter, there is shown in the drawings example constructions of various embodiments; however, the disclosure is not limited to the specific methods and instrumentalities described herein. In the drawings:

FIG. 4 is a screenshot illustrating an example user interface according to one embodiment;

FIGS. 6-10 are example user interfaces according to various embodiments; and

DETAILED DESCRIPTION OF ILLUSTRATIVE EMBODIMENTS

The subject matter of the embodiments illustrated herein is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1A:
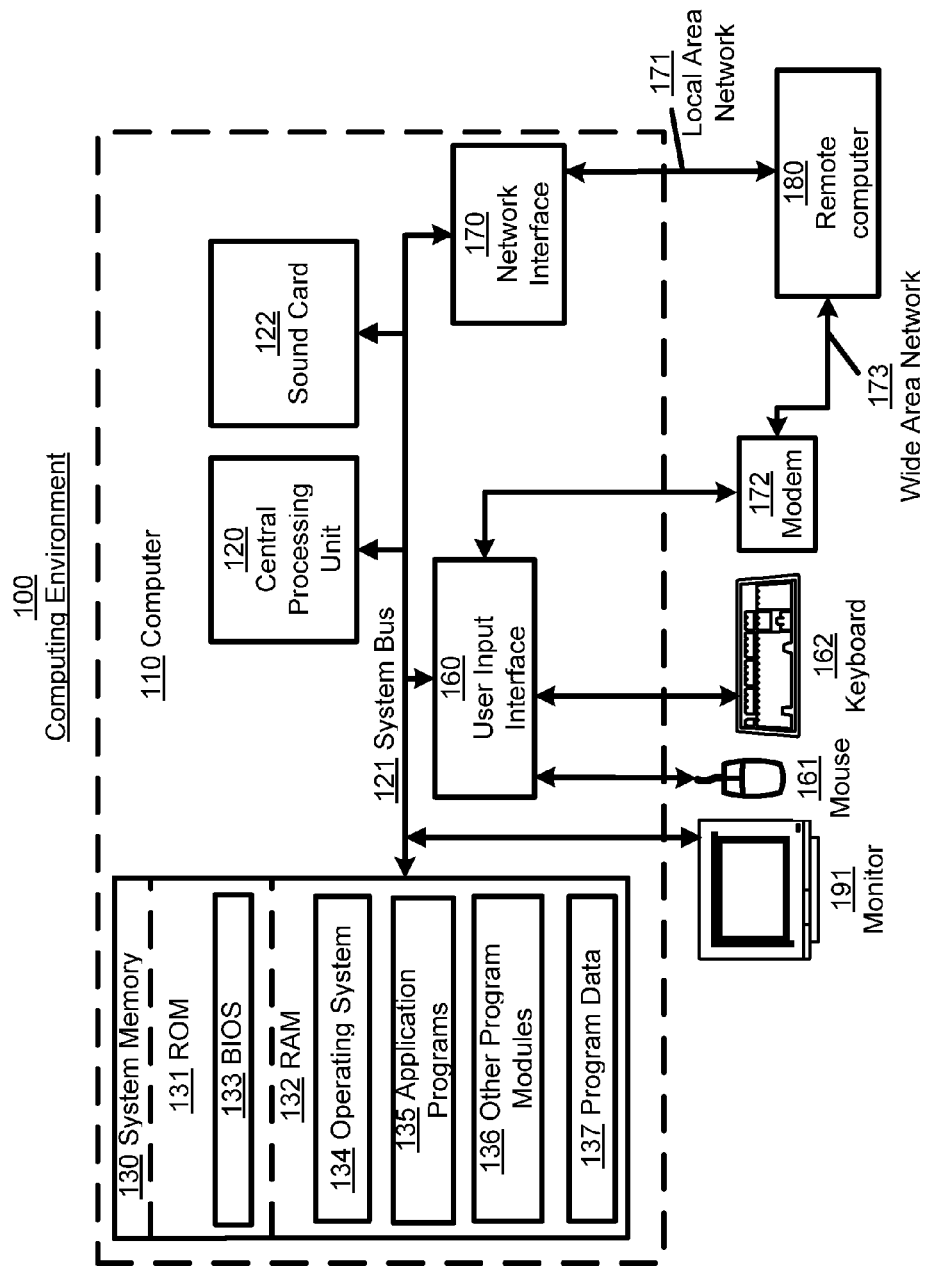
FIG. 1A illustrates an example computing environment in which aspects of one embodiment may be implemented.

FIG. 1A depicts an example computing environment 100 in which an example embodiment may be implemented. Computing environment 100 may include computer 110, monitor 191 and other input or output devices such as mouse 161, keyboard 162 and modem 172. Computers and computing environments such as computer 110 and computing environment 100 are known to those skilled in the art and thus are briefly described here.

An example system for implementing an embodiment includes a general purpose computing device in the form of computer 110. Components of computer 110 may include central processing unit 120, sound card 122, system memory 130, and system bus 121 that couples various system components including the system memory 130 to central processing unit 120.

System memory 130 may include computer storage media in the form of volatile and/or nonvolatile memory such as read-only memory (ROM) 131 and random access memory (RAM) 132. A basic input/output system (BIOS) 133 containing the basic routines that help to transfer information between elements within computer 110, such as during start-up, may be stored in ROM 131. RAM 132 typically contains data and/or program modules that are immediately accessible to and/or presently being operated on by central processing unit 120. System memory 130 additionally may include, for example, operating system 134, application programs 135, other program modules 136 and program data 137.

Embodiments may be implemented in computing environment 100 in the form of any of a variety of computer-readable media. Computer-readable media can be any media that can be accessed by computer 110, including volatile and nonvolatile, removable and non-removable media. Some embodiments may be provided to the computer via a network connection, for example from the Internet.

Computer 110 may operate in a networked environment using logical connections to one or more remote computers, such as remote computer 180. Remote computer 180 may be a personal computer, a server, a router, a network PC, a peer device or other common network node, and typically includes many or all of the elements described above relative to computer 110. The logical connections depicted in FIG. 1A include local area network (LAN) 171 and wide area network (WAN) 173, but may also include other networks. Such networking environments may be common in offices, enterprise-wide computer networks, intranets, and the Internet.

When used in a LAN networking environment, computer 110 may be connected to LAN 171 through network interface 170. When used in a WAN 173 networking environment, computer 110 may include modem 172 for establishing communications over WAN 173, such as the Internet. Modem 172 may be connected to system bus 121 via user input interface 160 or other appropriate mechanism.

Computer 110 or other client device can be deployed as part of a computer network. In this regard, various embodiments pertain to any computer system having any number of memory or storage units, and any number of applications and processes occurring across any number of storage units or volumes. An embodiment may apply to an environment with server computers and client computers deployed in a network environment and having remote or local storage. An embodiment may also apply to a standalone computing device, having programming language functionality, interpretation and execution capabilities.

Electronic File Management Systems

An electronic file management system provides a mechanism for organizing and managing an event using an electronic organizational structure. Events may include, by way of example, a litigation matter, an insurance claim, and the like; however, embodiments are not limited to these events. In addition, an embodiment may provide a mechanism for associating an electronic document with one or more components of the event. A component of an event may be anything that is related to the event. For example, if the event is an insurance claim, a component may be a party (e.g., the insured entity or a third party), property (e.g., insured vehicle or residence, third party vehicle or other property, etc.), other entities (e.g., doctors, lawyers, witnesses, governmental agencies, etc.) and the like. If the event is related to a litigation matter, a component may be, for example: a pleading or other court filing, a party to the suit, a witness, an expert, a consultant, and the like. The choice of what constitutes a component of the event may depend on, for example, the specifics of the event itself, the manner in which the event is to be organized, etc. For purposes of explanation and clarity, the discussion herein focuses largely on an insurance claim event.

An event may have any number documents that are associated with it. A document may be, for example, a doctor's report, a bill, a pleading or other legal document, reference material, an insurance policy, a photograph, an audio recording, a video recording, a witness statement, an expert or other consultant report, and the like. It will be appreciated that the preceding list of possible documents is for illustration purposes only and is not meant to be exhaustive or limiting. Rather, it will be appreciated that a document may be any type of information that is relevant to an event in some way. Documents may be created in electronic form or may be converted into electronic form, as will be discussed below.

Figure 1B:
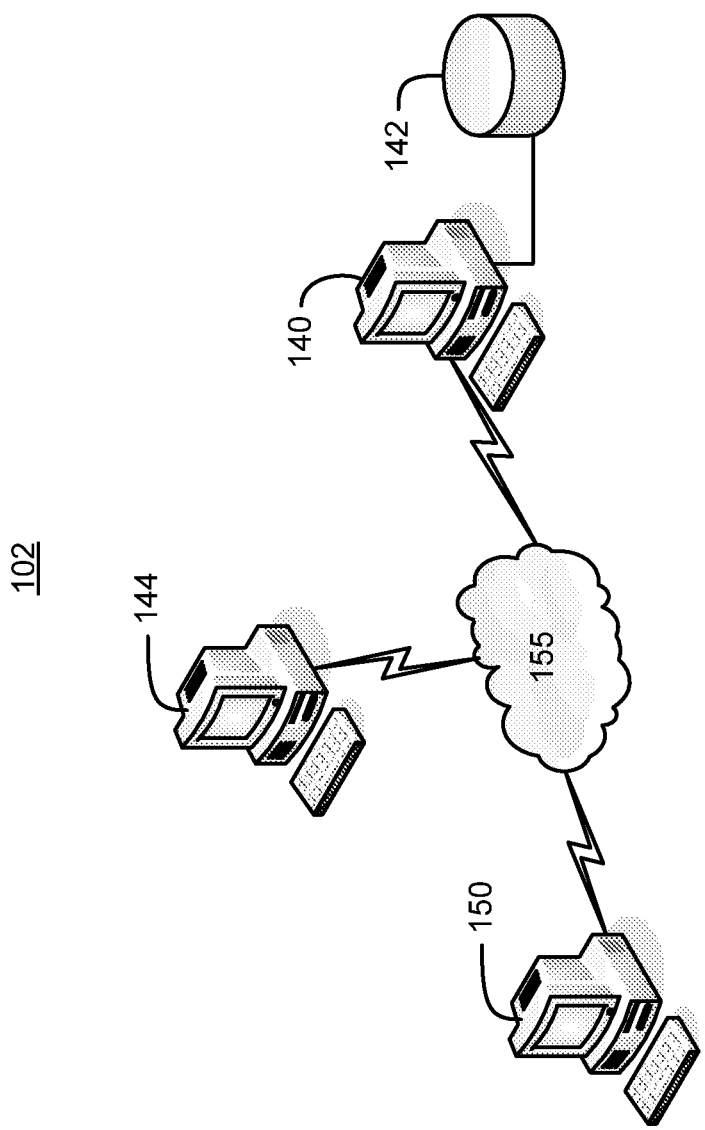
FIG. 1B illustrates an example computer network in which aspects of one embodiment may be implemented.

Referring now to FIG. 1B, in one embodiment, system 102 for managing an event is illustrated. System 102 may include computer network 155 such as, for example, a Transport Control Protocol/Internet Protocol (TCP/IP) network (e.g., the Internet, an intranet, etc.). Party 144 to the event may be operatively coupled to network 155. Likewise, one or more third parties 150 to the event may also be operatively coupled to network 155 in order to allow communication between party 144, third party 150, and event manager 140. In an embodiment in which the event is an insurance claim, party 144 may be, for example, the insured party. In an embodiment in which the event is litigation, party 144 may be, for example, a party to the suit. Third party 150 may be, for example, a consultant, an expert, a witness, etc. It should be appreciated that parties 144 and 150 are represented in FIG. 1B by a computing device that may be associated with such entities. Such a computing device may be configured as described above in connection with FIG. 1A, for example. However, such entities may be present with respect to the event, but may lack a corresponding computing device. Thus, in an embodiment, any of the parties 144 and 150 need not be operatively connected to network 155, but may conduct business related to the event via other (e.g., non-electronic) means.

Event manager 140 may be any entity, person, or the like which may organize, track, monitor, etc., the event. For example, if the event is an insurance claim, event manager 140 may be a service representative of an insurance company. If the event is litigation, event manager 140 may be a litigant, a court clerk, or the like. Operatively coupled to event manager 140 may be data repository 142. Data repository 142 may store any type of electronic document that is related to the event. An electronic document may be any of the documents discussed above, whether originally created and stored in data repository 142, or whether converted (e.g., scanned, etc.) into electronic form and then stored in data repository 142, or the like. In addition, although data repository 142 is shown in FIG. 1B as being directly operatively coupled to event manager 140, data repository 142 may be operatively coupled to event manager 140 by way of, for example, network 155 or the like.

Each of parties 144 and 150, as well as event manager 140, may include a respective network interface for communicating with network 155 (e.g., outputting information to and receiving information from network 155), such as by transferring information (e.g., instructions, data, signals) between such parties 144 and 150, and network 155. Accordingly, through network 155, parties 144 and 150 may communicate with event manager 140. For clarity, FIG. 1B depicts only one party 144, one third party 150 and one event manager 140. However, system 102 may include any number of such entities.

Figure 2:
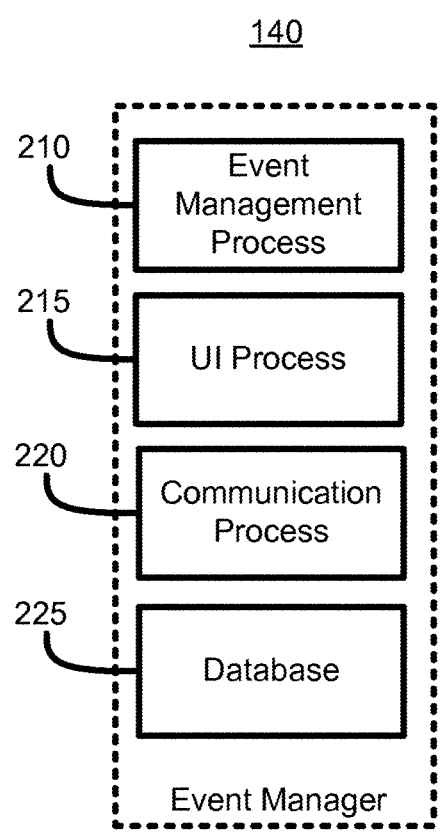
FIG. 2 illustrates an example event management system according to one embodiment.

Referring now to FIG. 2, event manager 140 is illustrated in more detail. Event management process 210 which, for example, may be stored on a computer-readable medium known in the art, may be included in event manager 140 and is operatively coupled to network 155 (FIG. 1B), and to database 225. As will be discussed below, event management process 210 may be used to create, modify or delete information relating to an event, where the information may contain electronic documents and other data. User interface process 215, which may be, for example, stored on a computer-readable medium known in the art, may be included in event manager 140, and may be operatively coupled to network 155 and to data repository 142 (FIG. 1B). User interface process 215 may be adapted to display information on a display device. Communication process 220, which may be, for example, stored on a computer-readable medium known in the art, may be included in event manager 140 and may be operatively coupled to network 155 and to database 140b. Communication process 220 may enable communication with other devices or components made available by way of network 155, for example.

In one embodiment, processes 210-220 may be an integral part of a software application, while in other embodiments processes 210-220 may each be a separate application, API, plug-in, software component, etc. In an embodiment, database 225 may be located outside of event manager 140 and may still be operatively coupled to event manager 140. In an embodiment, database 225 may include one or more files that each relate to an event. In an embodiment, database 225 includes an organizational structure (e.g., a tree structure or the like) that describes the event.

Figure 3:
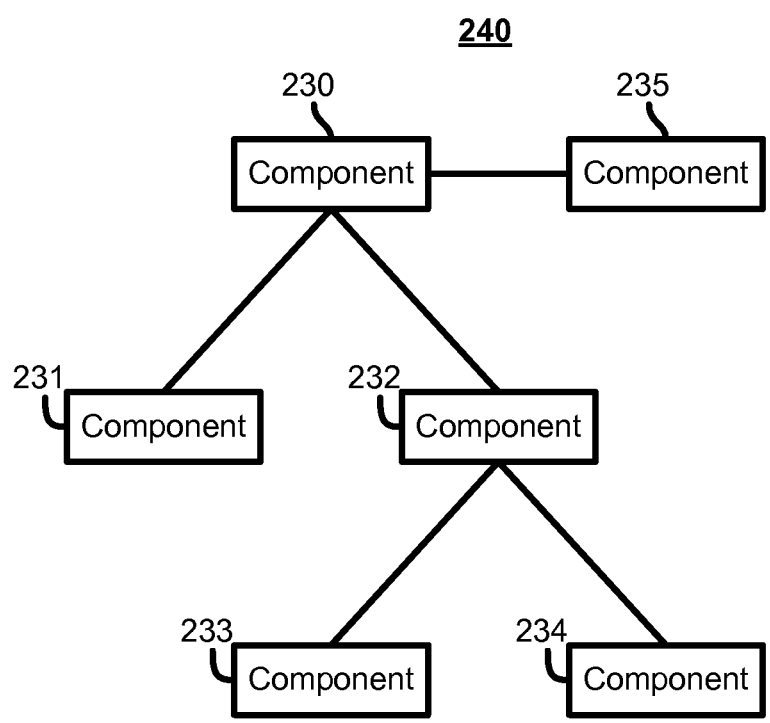
FIG. 3 illustrates an example organizational structure according to one embodiment.

Referring now to FIG. 3, an example organizational structure 240 that may be used to represent an event is illustrated. For purposes of clarity, the discussion herein refers to organizational structure 240 as a "tree structure." However, it will be appreciated that any type of organizational structure 240 is consistent with an embodiment, and therefore embodiments are not limited to a tree structure. Instead, a tree structure is just one possible organizational structure 240 that may be used in connection with an embodiment.

In an embodiment, organizational structure 240 may be formed from, for example, database entries, data fields or the like, that represent components 230-235 of the event. In other words, organizational structure 240 may be any data construct in which a relationship between at least two entities within the construct is maintained. The relationship between components 230-235 is illustrated in FIG. 3 as the lines connecting each component 230-235. Such components 230-235 may be any type of data structure, such as, but not limited to, a file, a file folder, data field(s), database entry and the like.

A relationship between two or more components 230-235 may be maintained by using links, data properties, free-text, or by using predefined fields that may describe and associate the components. Automated processes may also be used. Component relationship may be as siblings (e.g., component 230 to component 235, component 231 to component 232, and component 233 to component 234), parent-child (e.g., component 230 to either of components 231-232, or component 232 to either of components 233-234), grandparent-grandchild (e.g., component 230 to either of components 233-234), or the like. However, these relationships are illustrative only, as any type of relationship between components 230-235 may be established.

FIG. 4 illustrates an example user interface providing a graphical user interface depicting a navigation bar 400 corresponding to a hierarchical data structure. In this example, the hierarchical data structure is associated with a loss event, although in general the structure may be associated with any sort of event. It will be appreciated that the manner in which information is presented in navigation bar 400 is for purposes of illustration and explanation only, and an embodiment is not limited to a particular arrangement such as that illustrated in FIG. 4. In one embodiment, a description or data relating to various components of the event may be placed in appropriate locations of the tree structure. For example, an "insured party" data structure may in turn have one or more data fields (for free text entry, predefined field selection, etc.) into which data relating to the insured party may be placed as discussed above in connection with FIG. 3. In the depicted example, the event is an insurance claim related to an automobile accident. The data structure may contain nodes corresponding to components common to all events. For example, the example data structure contains nodes corresponding to documentation 401, file management 402, reserves and payments 403, and a policy 404. The data structure may be populated with nodes corresponding to components of the event described by the received data, including, for example, a governmental agency 405, a witness 406, a pedestrian 407, two vehicles 408, 409, and other property 410, 411. For example, an automobile insurance claim may proceed in a substantially standard manner, and therefore a predefined tree structure, which may include some flexibility in terms of the specific data that may be entered, may be suitable for most or any automobile insurance claims.

A node of the data structure corresponding to a particular type of component may be automatically populated with a substructure defined for the type of component. For example, a node corresponding to a vehicle 408, 409 may be automatically populated with a child node corresponding to a driver 412, 413 respectively. A node corresponding to a hospital may be automatically populated with a child node corresponding to a doctor. Depending on the data received, a node may have additional substructures. For example, vehicle 408 has child node corresponding to an owner 414, and vehicle 409 has child nodes corresponding to a passenger 415 and an insurance company 416. The node corresponding to a driver 412 has child nodes corresponding to a hospital 417 and an attorney 418. Not all possible branches need be created for every event. For example, if an automobile accident involves no injuries, there may be no need for nodes related to medical matters.

Any number of components may be related to other components. For example, the insured party component may have an associated component relating to a medical examination, which in turn has an associated component relating to the retention of an attorney to collect the bill from the medical examination, and so forth. Thus, each component could have parent or child components that are each described in a data structure of some form.

In some embodiments, there will be a one-to-one correspondence between electronic file folders and nodes of the navigation bar 400. The file folder hierarchy may be created in parallel with or after the construction of the hierarchical data structure. Each file folder is associated with a node of the data structure and may contain subfolders corresponding to substructures of the node of the hierarchical data structure, files associated with the node, and other data.

One or more files may be associated with a folder of the file folder hierarchy. As noted above, a file may be any type of electronic data that is associated with a component of the event. Such electronic data may have been received by the event manager 140 electronically (e.g., by way of parties 144 or 150 as discussed above in connection with FIG. 1B), or may have been received in paper or other analog form, or as a disk or other computer-readable media, etc. It will be appreciated that if the electronic data was received in a non-electronic form, some intermediate step(s) involving scanning or the like may take place. In addition, a manual or automated step of storing or accessing electronic data that is received as a computer-readable media may take place.

Associating a document with a component may involve any number of steps. For example, in one embodiment the document may be located in data repository 142 as discussed above in connection with FIG. 1B. It will be appreciated that "associating" an electronic document with a component of an event may include any mechanism for enabling a user, such as an event manager, to directly access the electronic document. Thus, once associated, a user is able to access the document without, for example, navigating through a file structure in which the document may be stored. In one embodiment, the association may automatically provide a hyperlink that, when clicked, either displays the document or presents options for viewing, modifying or otherwise interacting with the document, for example. The hyperlink may be a link to the document as stored in, for example, data repository 142.

Figure 5:
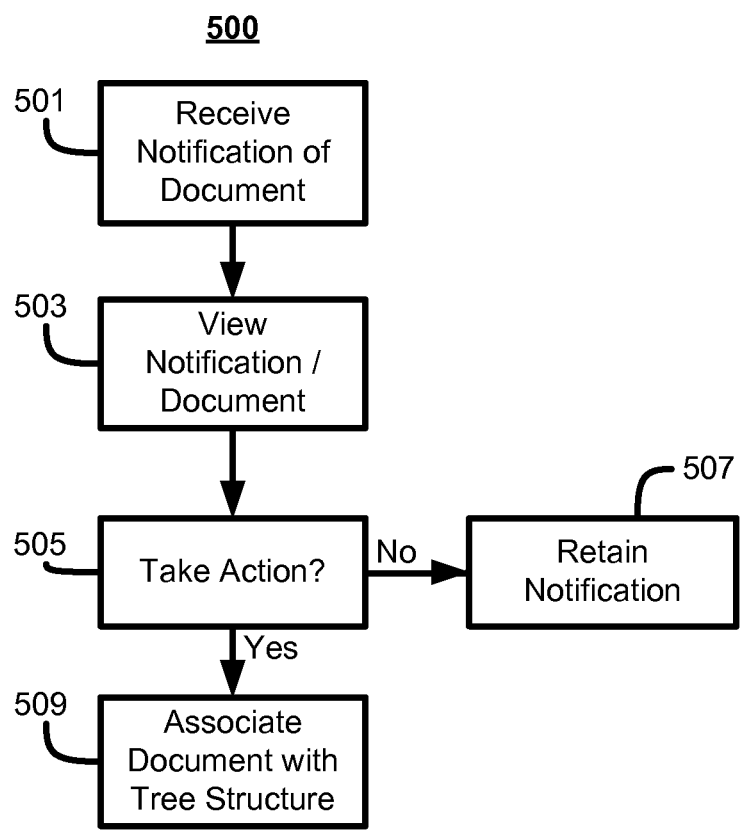
FIG. 5 is a flowchart illustrating an example method of associating an electronic document with a component of an event.

FIG. 5 illustrates an example method 500 of associating an electronic document with a component of an event. At step 501, a notification pertaining to the presence of a new event-related document is received by, for example, event manager 140 as discussed above in connection with FIG. 1B. In one embodiment, the notification is generated by event manager 140 upon the receipt of a new electronic document, and then presented to a user, which may also be event manager 140. An example of such a notification will be discussed below in connection with FIG. 6. The notification may contain an indication that an electronic document is available for association to one or more components of the event. It will be appreciated that prior to or in connection with step 501 some association of the electronic document to the event itself may be made. For example, when the electronic document is received, it may already be associated with the event using a matter identifier or the like. Alternatively, the event to which the document pertains may be ascertained and then the document may be associated with the event using a filename, identifier, etc.

At step 503, the notification may be viewed. As part of step 503, the document may be viewed, modified, or the like. At step 505, a determination is made as to whether any action should be taken with respect to the document. For example, an event manager or the like may need to associate the document with a component of the event. Alternatively, the event manager or the like may determine that no action is required. Such a situation may arise, for example, if a user that reviews the notification does not have the authority to associate the document with a component of the event. Alternatively, the user that reviews the notification may, because of an internal business procedure, or the like, not wish to allow another user to associate the document with a component of the event. For example, if the event is an insurance claim, more than one service representative may be able to work with the tree structure representing the claim, but only the primary representative servicing the claim may be responsible for associating the document with a component of the event. Thus, if the determination of step 503 is that no action need be taken, at step 507 the notification may be retained. Thus, the notification may be kept available for future viewing and a repeat of steps 503-505.

If the determination of step 503 is that an action should be taken, and then at step 509 the document may be associated with a component of the tree structure. As noted above, any manner of associating the document with the component such that the document is rendered directly accessible by a user such as an event manager is consistent with an embodiment. Such a manner of associating the document with a component may be enabled by any type of software or hardware mechanism, which may be conventional. Upon the completion of step 509, the notification may be retained or deleted.

Figure 6:
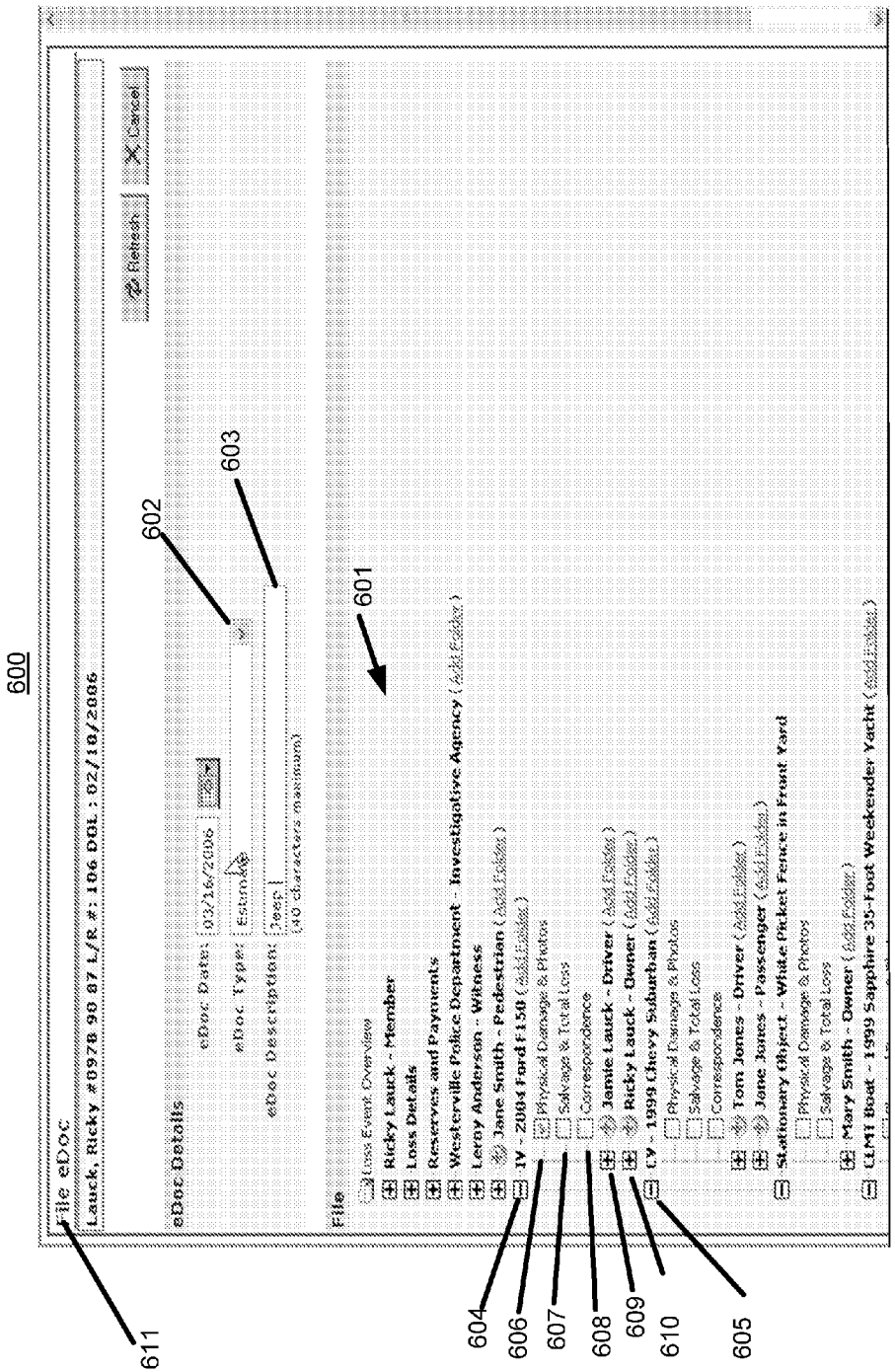

FIG. 6 illustrates an example user interface 600 in which aspects of an embodiment of the data structure 601 may be displayed to a user such as, for example, an event manager, for purposes of associating a preselected electronic document with nodes of the data structure 601. It will be appreciated that the manner in which information is presented in user interface 600 is for purposes of illustration and explanation only, and an embodiment is not limited to the particular arrangement illustrated in FIG. 6.

User interface 600 provides a mechanism for associating a document with one or more components of the event. It will be appreciated that user interface 600 may be accessed by way of a "File eDoc" command. For example, a user may wish to update or add an association for a particular document. The window title, "File eDoc" 611, refers to an electronic document, "eDoc," that has been preselected by a user for association. A pull-down menu 602 allows a user to select a document type to be associated with the preselected document. By way of example, document types may comprise descriptors such as "Outgoing Correspondence", "Medical/Wage Authorization", "Claims Photos", "Vehicle Rental Bill", and the like. A text entry box 603 allows a user to enter a description of the preselected document.

Within user interface 600 is data structure 601. It can be seen that in the example user interface 600 of FIG. 6, the event is an automobile insurance claim (i.e., a "loss event" as displayed in FIG. 6) that is organized into component 604, which corresponds to a first vehicle, and component 605, which corresponds to a second vehicle. It can be seen that components 604, 605 each have related components. For example, component 604 has components which correspond to physical damage and photographs 606, salvage and total loss 607, and correspondence 608. Additionally, vehicle component 604 has components corresponding to a driver of the vehicle 609 and the owner of the vehicle 610 which in turn may each have components relating to them that are not expanded in the view depicted, as indicated by the boxed "+" in front of the components 609, 610.

As can be seen in FIG. 6, the displays for certain components, such as those corresponding to physical damage and photographs 606, salvage and total loss 607, and correspondence 608, each have a checkbox associated with them. By selecting one or more checkboxes, a user may associate the preselected electronic document with one or more nodes of the data structure 601 corresponding to the selected checkboxes, and thus with one or more corresponding electronic file folders. This mechanism allows a user to add or update the associations between a file and various components of the data structure 601.

Similar user interfaces may be employed to provide a user with access to electronic documents for any purpose, such as, by way of examples and not limitation, sending a facsimile copy of the electronic document, creating notifications of "to do" items related to managing an electronic documents, reassociating an electronic document to another event, accessing a history of an electronic document, and the like.

Figure 7:
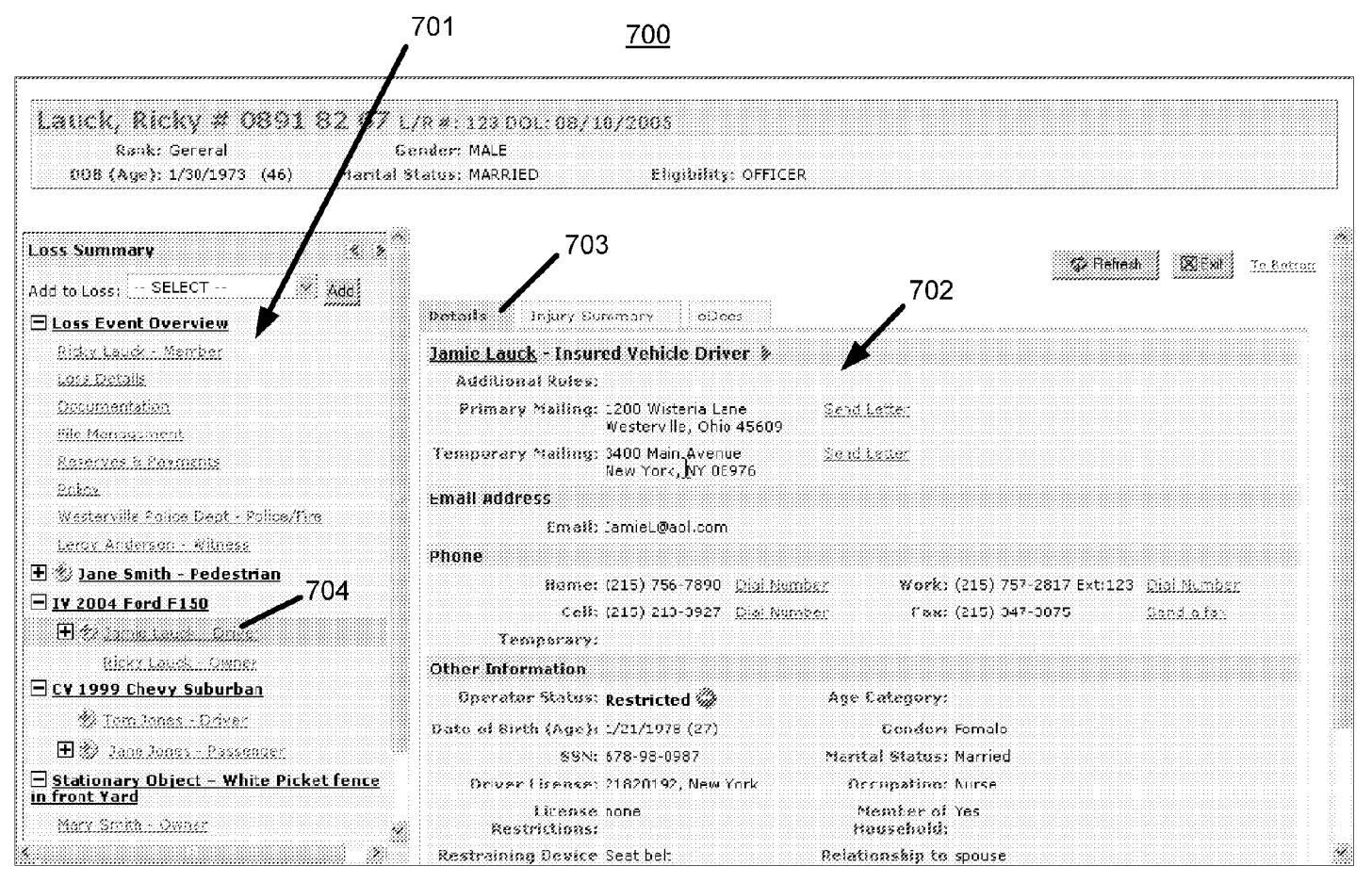

FIG. 7 illustrates an example of a user interface in which nodes of the data structure may be made accessible. User interface 700 illustrates tree structure 701, which may be as discussed above in connection with FIG. 4. If desired, only branches of the tree structure 701 having documents and/or details associated with them may be depicted on the user interface 700. When an element of the tree structure 701 is selected, an interface window 702 is populated with details associated with that element of the tree structure 701. In the example depicted in FIG. 4, a node 704 corresponding to a driver has been selected and the interface window 702 is populated with information related to the driver component. Tab 703 ("Details") has been selected and details related to the selected node populate the interface window 702.

Figure 8:
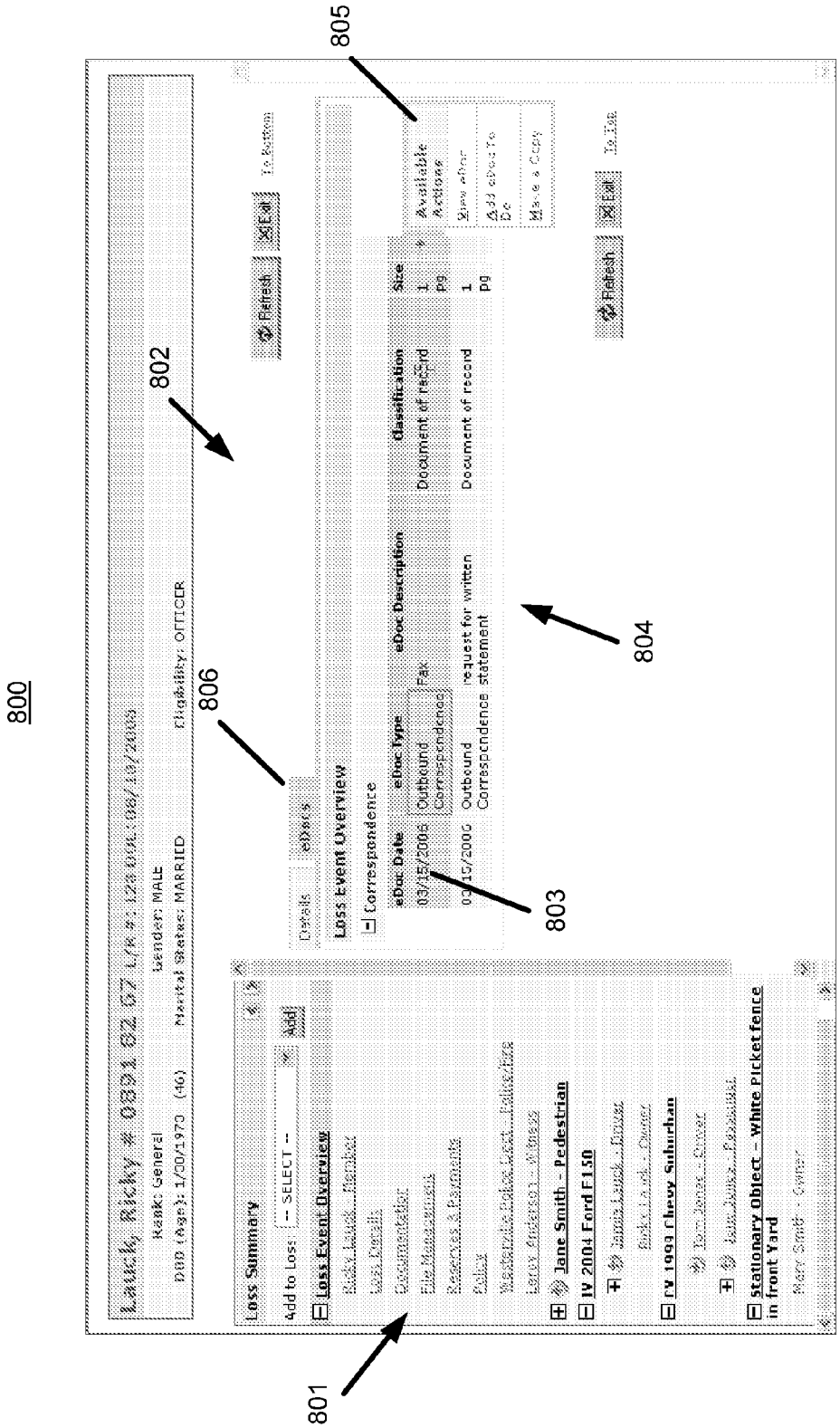

FIG. 8 illustrates an example of a user interface in which electronic documents may be made accessible. It will be appreciated that once a document has been associated with one or more components, a link or other mechanism may be used in an embodiment to provide direct access to the document. User interface 800 illustrates tree structure 801, which may be as discussed above in connection with FIGS. 4 and 7. In this figure, a node corresponding to a Loss Event Overview has been selected, and the "eDocs" tab 806 of interface window 802 has been selected. Information related to electronic documents associated with the selected node, such as, by way of example, file date, file type, file description, file classification (as discussed below), and file size, is displayed in interface window 802. Selecting a document 803 from the list of displayed documents 804 brings up a selection box 805 of available actions for the selected document 803. It will be appreciated that an embodiment permits such a hyperlink to both locate a document and launch an appropriate viewer, which may be internal or external to a software application that is providing user interface 800.

Some embodiments provide for two classifications of electronic documents: "Document of Record" and "Working eDoc." When a document is first received and associated with a component of an event, as described above, the document is classified as a "Document of Record" ("DoR"). Classification as a DoR limits the kinds of operations that may be performed on the electronic document to those that preserve the integrity of the original document, thereby prohibiting users from modifying or deleting the document. As examples, a user may be allowed to view or print the document, transmit a copy of the document, create a "To Do" item for the document, associate the document with another node, move the document to another event, view the history of the document, or request a rescan of an original physical document from which the electronic document was obtained. A user may also create a "Working eDoc" copy of the document, as described more fully below.

Audio Recordings

It is sometimes helpful to be able to associate an audio recording with an event. For example, if the event is an insurance loss event, it may be helpful to associate a recorded statement of a witness with the loss event. A customer service representative may receive a telephone call from someone associated with an event, and it may be useful to be able to record the call and easily associate the resulting recording with the event. Systems and methods for obtaining an audio recording, storing the recording, associating the recording with an event or with a component of an event, accessing and playing back the recording, and otherwise working with the recording are described below.

Figure 9:
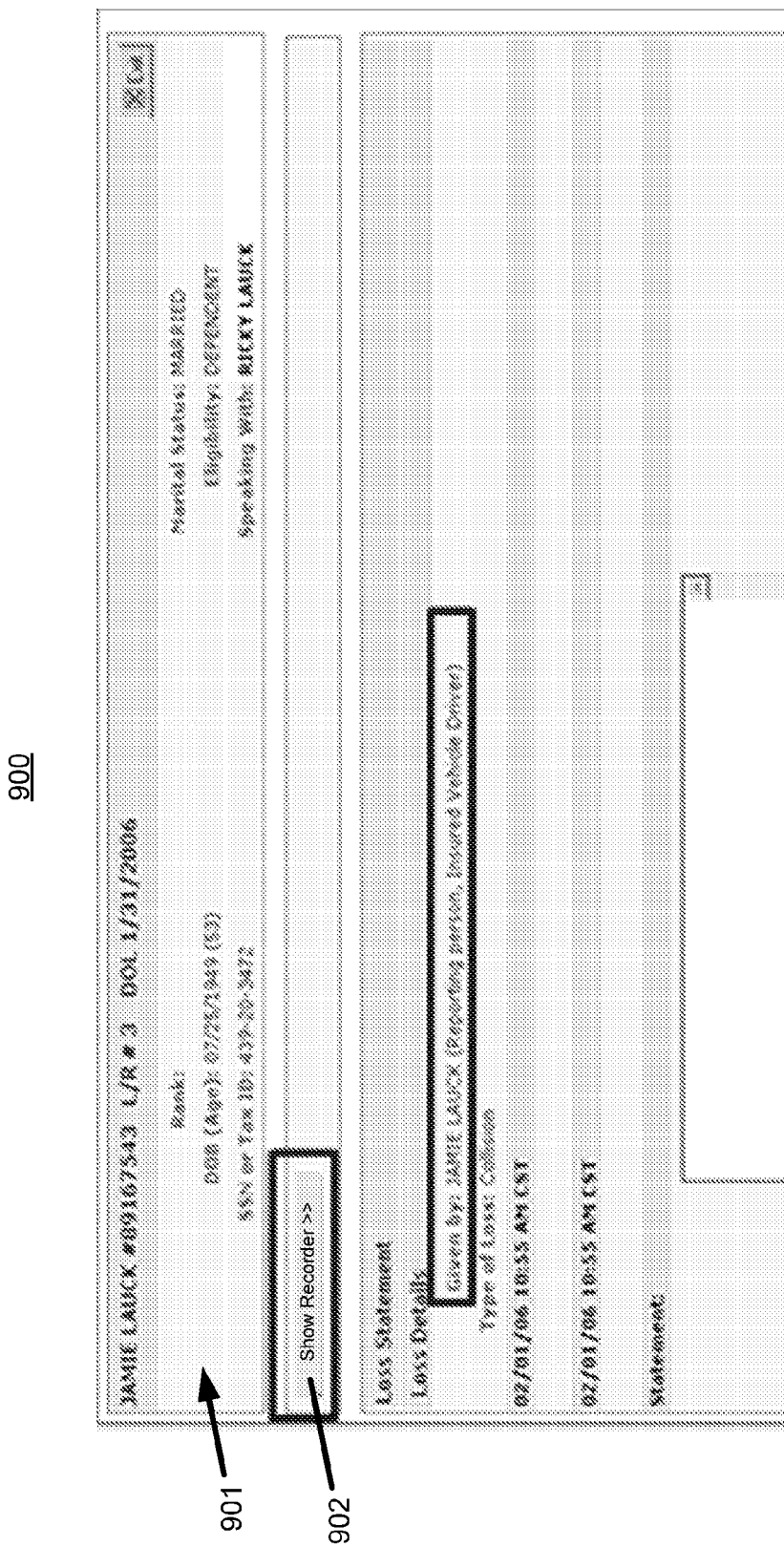

FIG. 9 is an example of a user interface 900 for an electronic file management system having an embodiment of a system for managing an audio recording. Although the electronic file management system of the example is associated with an insurance loss event, it will be readily appreciated that the system for managing an audio recording may be employed in other settings. For example, the event manager may be speaking with a driver on the telephone while working with the electronic file management system in relation to an insurance loss. The user interface 900 is one such as might be presented when an event manager has accessed a component of a loss event corresponding to a driver (e.g., driver 609 of FIG. 6). Some information about the accessed component is displayed in a portion of the window 901. The example interface presents a clickable "Show Recorder" button 902 which the event manager may use to activate a recording interface. The "Show Recorder" button 902 may only be displayed in contexts where it is relevant. For example, the "Show Recorder" button 902 may not be displayed in an interface related to a component of an event relating to an animal. Having the recording application integrated with the electronic file management system provides many benefits. A user's work may flow more naturally since the user need not switch between different applications. As will be described in more detail below, integration of the systems allows metadata related to an audio recording to be generated and associated with the recording automatically, obviating the need for annotating a recording manually.

Figure 10:
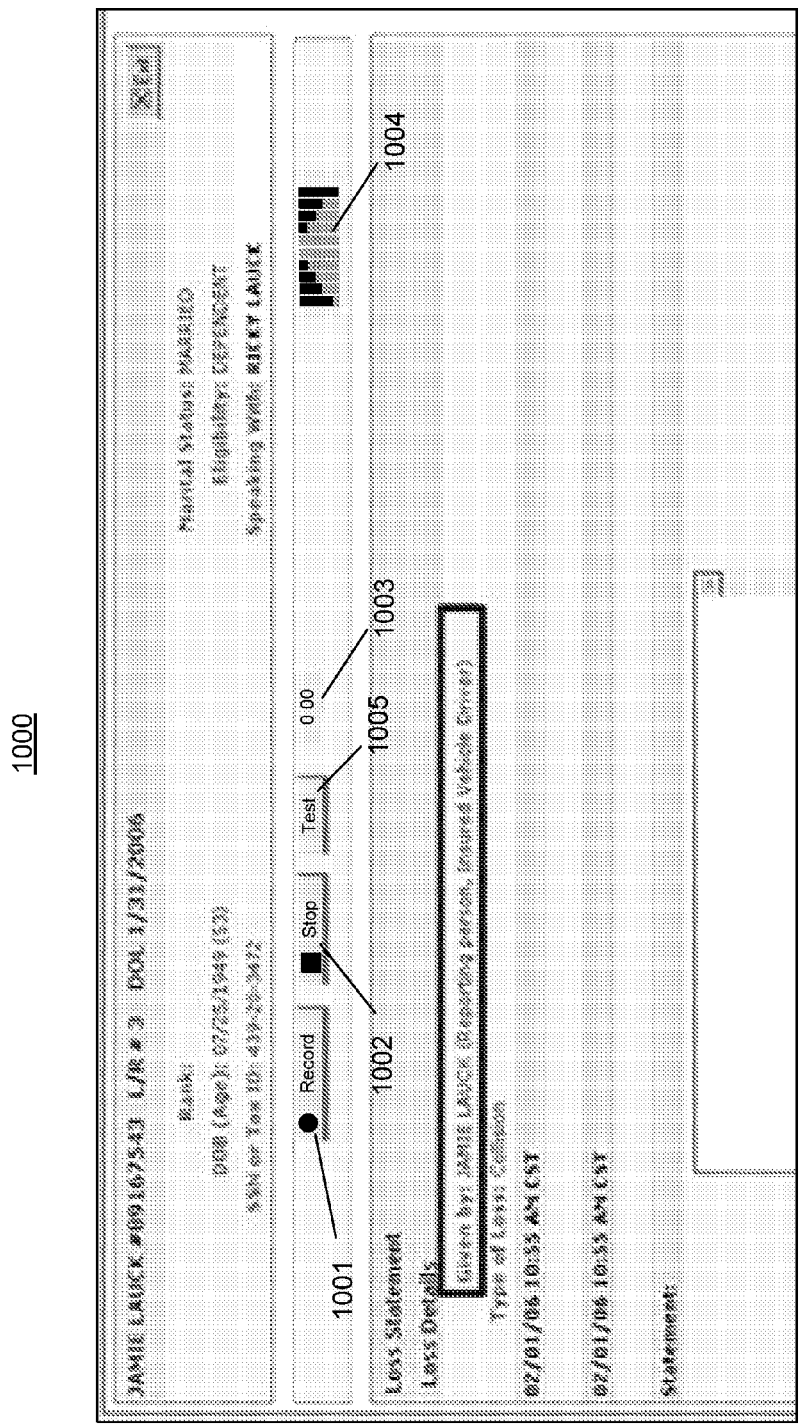

FIG. 10 shows a user interface 1000 such as might, for example, be presented after a user, such as for example an event manager, clicks on the "Show Recorder" button 902 (FIG. 9) and activates the recording interface. Buttons for starting a recording ("Record") 1001 and stopping a recording ("Stop") 1002 are provided. A counter 1003 displays the elapsed time of an active recording session. A level meter 1004 may be provided to enable the user to ascertain whether appropriate recording levels are being attained while the recording is in progress. A test button 1005 is provided to allow a user to test the recording system without actually storing a resulting recording. For example, the test button may initiate a brief recording session followed by a playback of the resulting recording. The user interface 1000 might, for example, be provided via a web-based distribution such as, for example, a browser plugin. Web-based distribution obviates the need for special software to be pre-installed on a local computer and avoids many of the problems that may be associated with software deployment.

In an embodiment, a recording mechanism is activated when the "Record" button is pushed. The recording mechanism may make use of a microphone input provided by a local desktop computer or other means of receiving an audio signal. In this manner, the recording mechanism may leverage a sound card or other audio processing components already present in the local computer. An interface cable for attachment to a telephone or other audio source may be used. The attachment may be integrated with a telephone headset or the like. The recording mechanism may comprise a software audio recorder application such as, for example, a Java applet that may be deployed via a network connection. Access to the applet may be via a defined Uniform Resource Locator (URL). The voice recorder application may provide application programming interfaces independent of a particular user interface, thereby enabling designers to integrate the audio recorder into an application using their own user interface controls.

In an embodiment, when a recording is initiated, incoming audio signals, if not already digital, are converted from analog to digital and may be compressed. Compression may be accomplished using an audio codec. For example, JSPEEX, an open source audio codec, enables relatively high compression and is well suited to compression of recorded speech. Relatively low sampling rates may be used for digitizing speech, resulting in relatively small ultimate file sizes.

In an embodiment, when the "Stop" button is clicked, recording ceases and a local copy of the digital data representing the recording is automatically uploaded to a server. A file copy of the recording is not saved at the local computer, thereby helping to maintain the security of the recording. Recording duration may be limited so that the memory capacity of the local computer is not overrun. Warnings may be provided to a user when the recording limits are being approached. Access to the recording on the server can be restricted to facilitate preserving the integrity of the recording. The recording system may capture metadata related to the recording at least in part from the context from which the recording was initiated. For example, if a recording was initiated from a window of the electronic file management system relating to a component of an event, metadata relating to that component may be uploaded along with the recording and associated with the recording in the electronic file management system. The metadata may be used to determine where the recording is to be filed, such as in an electronic folder corresponding to the related component of the event. Any errors generated during the recording may be logged and the log uploaded to the server.

A general error persistence database may be provided on the server side for temporarily holding errored recordings. An errored recording is one that was not successfully stored in an intended storage facility and/or one for which associated metadata is not properly stored. An error administration application may be provided to facilitate re-processing errored recordings. In an embodiment, administration application for editing metadata associated with a recording and triggering the storage of the recording in a primary database may be provided via a web browser interface.

Once a recording has been associated with a component of an event, the recording can then be accessed from the electronic file management system through the user interface associated with that component much like any other file associated with the component would be accessed. When a recording is accessed, a player application may be launched. Digital audio player applications are well known. Besides facilitating playback of the recording, the user interface of the electronic file management system may facilitate other functionality relating to the recording such as, for example, emailing the recording, editing metadata related to the recording, reassociating the recording with another component of the event or with another event, requesting a manual transcription of the recording, launching an automated conversion of the recording from speech to text, and the like.

An interface may be provided to facilitate the importation of an existing audio file into the electronic file management system, bypassing the recording application. For example, a digital audio file may have been created on a portable device by a field representative. A user may access an "import file" function from an interface related to a component of the event. The digital audio file is accessed, converted to a specific format and compressed if necessary, and then uploaded to the server much like a recording as described above. Metadata related to the component of the event would be uploaded and associated with the audio file.

Figure 11:
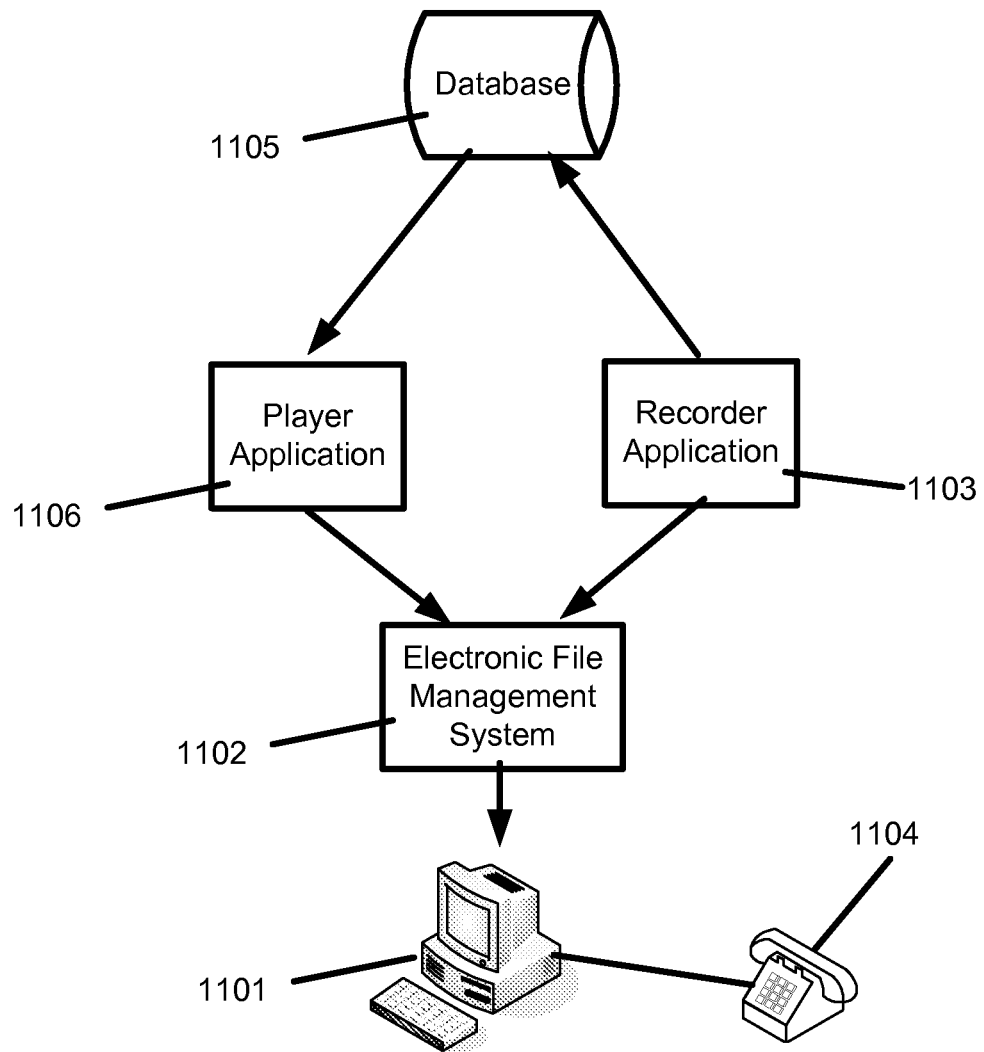
FIG. 11 is a simplified block diagram of a system according to one embodiment.

FIG. 11 is a simplified diagram of an embodiment of a system such as that described herein. A local computer 1101 is used to access an electronic file management system 1102. The electronic file management system 1102 may be provided to the local computer 1101 via a network interface and may be accessed via a web browser application. A recorder application 1103 is operatively linked to the electronic file management system 1102. The recorder application 1103 may, for example, be embodied in an applet that may be integrated with or embedded in the electronic file management system 1102. The recorder application 1103 is configured to create a compressed digital recording from an audio source 1104, such as a telephone, for example, that is operatively connected to the local computer 1101. The digital recording created by the recorder application 1103 is uploaded to a database 1105. Metadata related to the recording may be obtained at least in part from the electronic file management system 1102, and this metadata is uploaded to the database 1105 and associated with the recording. A player application 1106 may be integrated with or embedded in the electronic file management system 1102.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Portions of the methods and system described herein may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the methods described herein. When implemented on a general-purpose processor, the program code combines with the processor to provide a unique apparatus that operates to perform the methods described herein.

While the systems and methods have been described in connection with the embodiments and the various figures, it is to be understood that other similar embodiments may be used or modifications and additions may be made to the described embodiments for performing the same functions disclosed herein. Therefore, the invention should not be limited to any single embodiment, but rather should be construed in breadth and scope in accordance with the appended claims.

The invention claimed is:

1. A system for generating an electronic recording and storing the electronic recording in an electronic file system in a computer network comprising:
  a processor; and
  a non-transitory computer-readable medium coupled to the processor having computer-readable instructions executable by the processor to:
    provide a user interface adapted to display a representation of a hierarchical data structure, said hierarchical data structure comprising nodes associated with components of an event, and to detect a selection of a node of the hierarchical data structure;
    provide an electronic file folder access process for providing access to an electronic file folder in an electronic file folder hierarchy in response to a detection of the selection of the node, said electronic file folder being associated with the selected node of the hierarchical data structure; and
    provide, via a web-based interface, an audio recording application configured to:
      automatically associate metadata derived from data associated with the selected node of the hierarchical data structure with a digital recording uploaded upon completion of an audio recording process;
      determine if the digital recording includes at least one storing error;
      upon determining that the digital recording includes at least one storing error, reprocess the digital recording; and
      file the reprocessed digital recording, based on metadata associated with the reprocessed digital recording, during reprocessing, in the electronic file folder corresponding to related components of the event.

2. A system as recited in claim 1, wherein the user interface is configured to detect a selection of an action related to a digital audio file and to initiate the selected action wherein the action comprises at least one of the following: playing the audio file, emailing a copy of the audio file, viewing a history of the audio file, and requesting a written transcript of the audio file.

3. A system as recited in claim 1, wherein the web-based interface is configured to:
  initiate with at least one button a test of the audio recording process, said test comprising:
    initiating the audio recording process;
    digitally recording a received audio signal for a predetermined period; and
    playing back the recorded audio signal.

4. A system as recited in claim 1, the instructions further configured to:
  provide an interface for receiving an audio signal from a telephone and communicate the audio signal to the audio recording process.

5. A system as recited in claim 1, wherein:
  the user interface is provided via a web browser.

6. A system as recited in claim 1, the instructions further configured to:
  provide an interface configured to enable a user to manually associate metadata derived from data associated with a selected node of the hierarchical data structure with the digital recording.

7. A system as recited in claim 1, the instructions further executable to:
  receive a notification of a new event-related electronic document, wherein said notification includes an indication whether the new event-related electronic document is available for association with components of the event;
  allow a user to review the notification of the new event-related electronic document;
  determine whether the user has authority to associate the new event-related electronic document with components of the event;
  allow the user, in response to determining the user has authority, to associate the new event-related electronic document with components of the event based on a predetermined business procedure; and
  allow the user, in response to determining the user has authority, to create a notification of one or more actions to be taken to manage the new event-related electronic document.

8. A method for generating an electronic recording and storing the electronic recording in an electronic file system in a computer network comprising:
  using a non-transitory computer-readable medium having computer-readable instructions stored thereon for execution by a number of processors in a number of computing apparatuses in the computer network for:
  providing a user interface configured to provide a representation of a hierarchical data structure, said hierarchical data structure comprising nodes associated with components of an event;
  detecting a selection of a node of the hierarchical data structure; and
  initiating an audio recording application via a web-based interface, the audio recording application configured to:
    automatically associate metadata derived from data associated with the selected node of the hierarchical data structure with a digital recording uploaded upon completion of an audio recording process;
    determine if the digital recording includes at least one storing error;
    upon determining that the digital recording includes at least one storing error, reprocess the digital recording; and
    file the reprocessed digital recording, based on metadata associated with the reprocessed digital recording, during reprocessing, in an electronic file folder corresponding to related components of the event.

9. A method as recited in claim 8, further comprising:
detecting a selection via the user interface of an action related to a digital audio file wherein the action comprises at least one of the following: playing the digital audio file, emailing a copy of the digital audio file, viewing a history of the digital audio file, and requesting a written transcript of the digital audio file.

10. A method as recited in claim 8, further comprising:
testing the audio recording process by initiating the audio recording process with at least one button, digitally recording a received audio signal for a predetermined period, and playing back the recorded audio signal.

11. A method as recited in claim 8, further comprising:
receiving an audio signal from a telephone; and
communicating the audio signal to the audio recording process.

12. A method as recited in claim 8, further comprising:
providing the user interface via a web browser.

13. A method as recited in claim 8, wherein the event is a loss event associated with an insurance claim.

14. A method as recited in claim 8, further comprising:
receiving a notification of a new event-related electronic document, wherein said notification includes an indication whether the new event-related electronic document is available for association with components of the event;
allowing a user to review the notification of the new event-related electronic document;
determining whether the user has authority to associate the new event-related electronic document with components of the event based on a predetermined business procedure;
allowing the user, in response to determining the user has authority, to associate the new event-related electronic document with components of the event; and
allowing the user, in response to determining the user has authority, to create a notification of one or more actions to be taken to manage the new event-related electronic document.

15. A computer readable medium comprising computer executable instructions for:
providing a user interface configured to provide a representation of a hierarchical data structure, said hierarchical data structure comprising nodes associated with components of an event;
detecting a selection of a node of the hierarchical data structure;
initiating an audio recording application via a web-based interface;
automatically associating, with the audio recording application, metadata derived from data associated with the selected node of the hierarchical data structure with a digital recording uploaded upon completion of an audio recording process; and
determining if the digital recording includes at least one storing error;
upon determining that the digital recording includes at least one storing error, reprocessing the digital recording; and
filing the reprocessed digital recording, based on metadata associated with the reprocessed digital recording, during reprocessing, in an electronic file folder corresponding to related components of the event.

16. A computer readable medium as recited in claim 15, further comprising computer executable instructions for:
detecting a selection via the user interface of an action related to a digital audio file wherein the action comprises at least one of the following: playing the audio file, emailing a copy of the audio file, viewing a history of the audio file, and requesting a written transcript of the audio file.

17. A computer readable medium as recited in claim 15, further comprising computer executable instructions for:
testing the audio recording process by initiating the audio recording process with at least one button, digitally recording a received audio signal for a predetermined period, and playing back the recorded audio signal.

18. A computer readable medium as recited in claim 15, further comprising computer executable instructions for:
receiving an audio signal from a telephone; and
communicating the audio signal to the audio recording process.

19. A computer readable medium as recited in claim 15, further comprising computer executable instructions for:
providing the user interface via a web browser.

20. A computer readable medium as recited in claim 15, wherein the event is a loss event associated with an insurance claim.

21. A computer readable medium as recited in claim 15, further comprising computer executable instructions for:
receiving a notification of a new event-related electronic document, wherein said notification includes an indication whether the new event-related electronic document is available for association with components of the event;
allowing a user to review the notification of the new event-related electronic document; determining whether the user has authority to associate the new event-related electronic document with components of the event based on a predetermined business procedure;
allowing the user, in response to determining the user has authority, to associate the new event-related electronic document with components of the event; and
allowing the user, in response to determining the user has authority, to create a notification of one or more actions to be taken to manage the new event-related electronic document.

* * * * *